United States Patent
Kumada et al.

[15] 3,661,442
[45] May 9, 1972

[54] ELECTRICALLY OPERATED OPTICAL SHUTTER

[72] Inventors: Akio Kumada, Kodaira; Masashi Koga, Kokubunji, both of Japan

[73] Assignee: Hitachi, Ltd., Tokyo, Japan

[22] Filed: Mar. 17, 1970

[21] Appl. No.: 20,244

[30] Foreign Application Priority Data

Mar. 25, 1969 Japan.................................44/22094

[52] U.S. Cl.....................350/150, 340/173 LS, 340/173.2, 350/149, 350/157, 350/160
[51] Int. Cl.........................................................G02f 1/26
[58] Field of Search..........350/147, 149, 150, 157, 160–161; 340/173 LT, 173 LS, 173.2

[56] References Cited

UNITED STATES PATENTS 3,559,185  1/1971  Burns et al............................350/157
2,680,146  6/1954  Rosenthal.............................350/149

OTHER PUBLICATIONS

Cross et al., " Gadolinium Molybdate A New Type of Ferroelectric Crystal," Phys. Rev. Lett. Vol. 21, No. 2 (Sept. 16, 1968) pp. 812–814.

Electronic Engineering, " Japanese Discover New Optoelectronic Properties," Vol. 41, (June 1969) p. 6.

Aizu, " Possible Species of Ferroelastic Crystals and of Simultaneouslly Ferroeletric and Ferroelastic Crystals," J. Phys. Soc. Jap. Vol. 27, No. 2 (Aug. 1969) pp. 387– 396.

Aizu et al.; " Simultaneous Ferroelectricity and Ferroelasticity of Gd 2 (MoO 4 )3" J. Phys. Soc. Jap. Vol. 27, No. 2 (Aug. 1969) p. 511.

Primary Examiner—David Schonberg
Assistant Examiner—Paul R. Miller
Attorney—Craig, Antonelli & Hill

[57] ABSTRACT

An optical shutter comprising a pair of crossed polarizing means, and at least one double-refractive crystal and at least one Z-cut irregular ferroelectric crystal both interposed between the pair of crossed polarizing means, the said crystal having equal retardations, the value of the resulting retardation R of the crystals in the open position of the shutter being $80 \leq R \leq 320$ or $R \geq 2000$, whereby a field at least equal to the magnitude of the coercive field $E_c$ of the irregular ferroelectric crystal or a stress at least equal to the magnitude of the coercive stress $T_c$ of the irregular ferroelectric crystal is applied to the same crystal to rotate the optic axial plane thereof by 90° to pass or stop the natural light transmitted through the shutter as desired.

12 Claims, 23 Drawing Figures

ELECTRICALLY OPERATED OPTICAL SHUTTER

BACKGROUND OF THE INVENTION

1. Field of the Invention

This invention relates to an optical shutter device for controlling the transmission or stoppage of a predetermined amount of natural light as desired.

2. Description of the Prior Art

Optical shutter devices of the following types are known in the art.

1. The so-called "iris stop" is used as the optical stop in a photographic camera. The "iris stop" is a device for mechanically controlling the cross section of a light beam, and the control of the cross section of a light beam is accomplished mechanically. Such a mechanical control requires the device to be operated directly by an electric signal and this leads to a larger size of the mechanism.

2. An electric eye camera (EE camera) uses a system which utilizes a pressure to push the shutter, whereas this system often suffers from operational trouble or failure.

3. It is also known to utilize the Kerr effect produced by applying a required voltage to nitrobenzene or like material so that light transmitted through the material may be subjected to a shutter action. The use of the Kerr effect, however, has a disadvantage in that the opening-state of shutter action cannot be kept unless a voltage is applied.

SUMMARY OF THE INVENTION

It is an object of the present invention to provide an electrically operated optical shutter which can effect the shutter action for a transmitted light beam without using any mechanical driving means.

It is a further object of the present invention to provide an electrically operated optical shutter which has a memory effect for a driving voltage signal even after the extinction thereof until the subsequent application of a voltage pulse of inverse polarity.

It is a still further object of the present invention to provide an electrically operated optical shutter which effects a shutter action for natural light.

In order to achieve these objects, the optical shutter of the present invention comprises a pair of crossed polarizers disposed in a light path, at least one ferroelectric crystal plate having forroelectric-ferroelastic properties in series with at least one double-refractive crystal plate both interposed between the pair of crossed polarizers in such a manner that the crystallographic c-axes of the crystal plates are normal to each other, wherein a voltage at least equal to the magnitude of the coercive field of the ferroelectric-ferroelastic crystal plate or a stress at least equal to the magnitude of the coercive stress of the same crystal is applied to the ferroelectric-ferroelastic crystal plate to thereby rotate the optic axial plane of the ferroelectric-ferroelastic crystal plate by 90° so as to provide a shutter action for natural light transmitted through the optical shutter device.

The inventors have found that a certain ferroelectric material has the direction of its spontaneous polarization reversed when a field exceeding the magnitude of the threshold field peculiar to the material (hereinafter referred to as "coercive field") or a stress exceeding the magnitude of the threshold stress peculiar to that material (hereinafter referred to as "coercive stress") is applied to that material and that the lattice strain produced in the crystallographic a- and b-axes of the material is equivalent to 90° rotation of the material about the crystallographic c-axis thereof and this phenomenon contains therein a memorizing action.

Figure 1A:
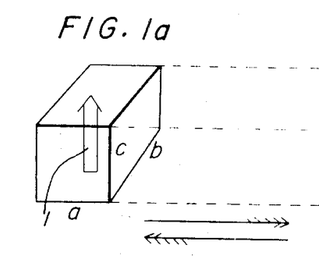
FIG. 1 is a perspective view for illustrating the correlation between the spontaneous polarization and spontaneous strain produced in an irregular ferroelectric crystal used in the optical shutter device of the present invention.
Figure 1B:
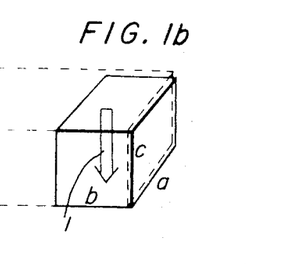

Years of research carried out by the inventor on ferroelectric materials show that a certain ferroelectric material such as potassium dehydride phosphate (hereinafter referred to as "KDP") or gadolinium molybdate (hereinafter referred to as "GMO") has a different property from the known ferroelectric materials such as triglycine sulfate, lead zicornate-titanate, barium titanate, etc. That is, if a field or a stress exceeding the threshold peculiar to such a certain material (hereinafter referred to as "coercive field" or "coercive stress") is applied to that material, the direction of its spontaneous polarization 1 is reversed 180° to shift from condition (a) to condition (b) or from condition (b) to condition (a), as shown in FIG. 1, depending on whether the original direction of the spontaneous polarization is positive or negative (downward or upward as viewed in FIG. 1). It has also been found that the crystal lattice is deformed as the aforesaid shift takes place and that this deformation is equivalent to a 90° rotation of the material about the crystallographic c-axis thereof. Thus, the inventors have discovered that such a material whose spontaneous polarization can be reversed by a field or a stress applied thereto and which can provide a crystal deformation falls within certain point groups of ferroelectric materials. More specifically, such a property is owned by certain materials belonging to point groups mm2, 2-I and 2-II. These materials are classified into point groups imm2, i2-I and i2-II, where i means irregular ferroelectrics, m represents the mirror symmetry in F-operation, 2-I represents a material of crystal lattice having a two-fold symmetry axis and whose 90° rotation about this axis enables the crystal lattice to register with the original crystal lattice of that material, and 2-II represents a material of crystal lattice having a two-fold symmetry axis and whose 180° rotation about this axis enables the crystal lattice to register with the original crystal lattice. Materials represented by imm2, i2-I, and i2-II also include irregular ferroelectric materials belonging to these point groups.

Figure 2A:
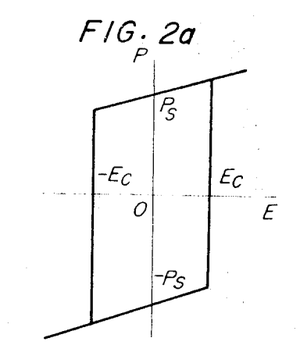
FIG. 2a illustrates a hysteresis loop between the electric field applied to the irregular ferroelectric crystal of the present invention and an polarization provided thereby.
Figure 2B:
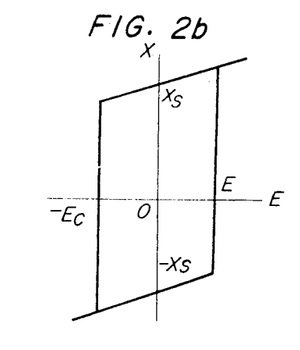
FIG. 2b illustrates a hysteresis loop between the electric field applied to an irregular ferroelectric crystal of the present invention and the strain produced therein.
Figure 3A:
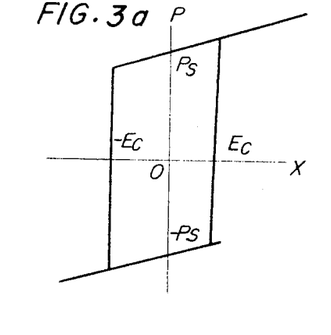
FIG. 3a illustrates a hysteresis loop between the stress applied to an irregular ferroelectric crystal of the present invention and the polarization provided thereby.
Figure 3B:
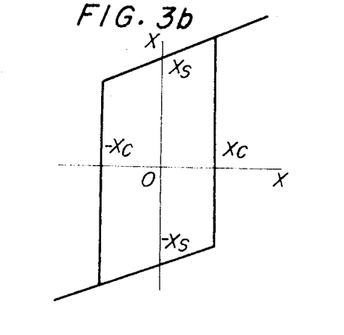
FIG. 3b illustrates a hysteresis loop between the stress applied to an irregular ferroelectric crystal of the present invention and the strain produced therein.

Any of the foregoing irregular ferroelectric materials shows a hysteresis loop as shown in FIG. 2a between an applied field E and the polarization P resulting therefrom, a hysteresis loop as shown in FIG. 3a between an applied field E and the strain X resulting therefrom, a hysteresis loop as shown in FIG. 3a between an applied stress and the polarization resulting therefrom, and a hysteresis loop as shown in FIG. 3b between an applied stress and the strain resulting therefrom. In these graphs, $E_c$, $X_c$, $P_s$, and $X_s$ represent coercive field, coercive stress, spontaneous polarization, and spontaneous strain respectively. As will be apparent from these graphs, it has been found that the aforementioned irregular ferroelectric materials have a ferroelectric property as well as a property which may be called a ferroelastic property. Thus, such materials are hereinafter referred to as "ferroelectric-ferroelastic materials," and they include the materials shown in the table below.

| Point group | Name of material |
| --- | --- |
| imm2 | KDP, GMO, boracite |
| i2–I | |
| i2–II | Potassium sodium tartrate<br>Ammonium cadmium sulfate<br>Ammonium aluminum methyl sulfate 1,2-hydride |

Figure 4:
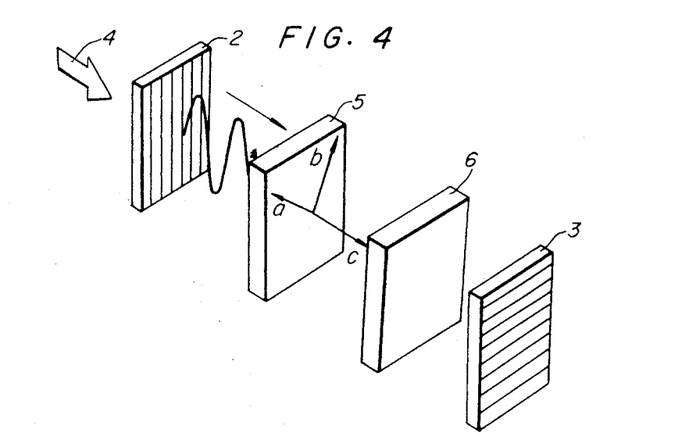
FIG. 4 is a view for illustrating the operational principle of the optical shutter device according to the present invention.

Any of such crystals shows an optically biaxial birefringence for the ferroelectric phase thereof, and has different refractive indices $\alpha$, $\beta$, and $\gamma$ for light vibrating parallel to the optically elastic axes X, Y, and Z of the crystal. For example, in case of a GMO single crystal which belongs to the point group $mm2$, $n_\alpha = 1.8428$, $n_\beta = 1.8432$ and $n_\gamma = 1.897$ at room temperature, for $\lambda = 589.3$. From this it is apparent that a crystal belonging to the point group $mm2$ shows a double refractivity as a biaxial crystal. Assume that such a GMO crystal is Z-cut (i.e., the end faces of the crystal are cut away perpendicularly with respect to the crystallographic c-axis) and interposed between the polarizer 2 and analyzer 3 with their vibration planes intersecting each other but with their polarization planes disposed parallel to each other, in such a manner that the Z-axis of the crystal is disposed perpendicularly with respect to the polarization planes of the polarizer and analyzer, as shown in FIG. 4. If natural light enters the polarizer 2 perpendicularly thereto, the natural light is formed into linearly polarized light by the polarizer 2 and is further formed into elliptically polarized light by the birefringence of the crystal plate 5. Further, only the component of the circularly polarized light which is equal to the polarization plane of the analyzer 3 is allowed to pass through the analyzer 3, whereby an interference color can be observed due to its retardation with respect to the lights of various wavelengths forming natural light.

Assume that one of these irregular ferroelectric crystals which has the $imm2$ symmetry is cut into a cube whose edges are provided by the crystal axes of the crystal and whose faces are polished into flat optical planes, that a transparent electrode is provided on the Z-surface of the crystal (i.e., that surface which is cut normal to the Z-axis of the crystal), and that this crystal is interposed in a diagonal position (slightly inclined) between two crossed-Nicol prisms. If natural light enters such a system, there appear interference colors provided by birefringence in accordance with the thickness of the crystal. This results from the phase difference or retardation R between the light beams caused by the crystal, and this retardation, as is well-known, has the following relation to the thickness $d$ of the crystal through which light passes and the difference $\Delta n$ between the two refractive indices of the double refraction:

$$R = \Delta n d$$

In an irregular ferroelectric material, as described above, the crystallographic a- and b-axes are interchanged by spontaneous polarization reversal, and this in turn causes a variation both in the thickness $d$ and the refractive index difference $\Delta n$ with respect to the light. If $R(+)$ and $R(-)$ represent the retardations for the light entering in the directions perpendicular to the polarization axes corresponding to the positive and negative polarizations, for example, in the directions of X and Y (which retardations are referred to as a transverse effect), then the following relations will be derived:

$$R(+) = d_x \cdot (n_\gamma - n_\beta)$$
$$R(-) = d_y \cdot (n_\gamma - n_\alpha)$$

Since normally $(d_x - d_y)/(d_x + d_y) = 0.01$ to 0.001 and $(n_\beta - n_\alpha)/n_\gamma = 1$ to 0.1, the polarization reversal results in a variation in the interference color provided by birefringence. Thus there can be obtained an element which can vary vivid colors with each other in accordance with the thickness thereof.

However, in case of the foregoing GMO single crystal, $(d_x - d_y)/(d_x + d_y) \approx 1.5 \times 10^{-3}$, $n_\beta - n_\alpha/n_\gamma \approx 2 \times 10^{-2}$, hence, $n_\beta - n_\alpha/n_\gamma \ll 0.1$ This means a disadvantage for a GMO single crystal in that its color variation range is too narrow to provide a color variation by utilizing the retardation variation resulting only from the variation in the birefringence of a transverse effect caused by polarization reversal.

The present invention provides a system different from the above-described one, namely, a novel system in which the direction of polarization is in accord with the direction of transmitted light.

Therefore, according to the present invention, both the length of the light path $d$ and the birefringence $|n_\beta - n_\alpha|$ are made invariable by the polarization reversal, the sign of the birefringence is changed, and accordingly, a number of unique phenomena take place in the double-refracted light passing through such an element. Description will now be made of such phenomena and the principle underlying them.

Applying an electric field exceeding the coercive field to the Z-cut GMO crystal plate 3 causes the reversal of the spontaneous polarization thereof, which in turn causes the optic axial plane of the crystal to rotate 90°, whereby the direction of the elliptically polarized light resulting from the retardation between the double-refracted light transmitted through the crystal is reversed. Thus, the retardation R in this case is equal to that having the opposite sign.

If a double-refractive transparent crystal 6 and a Z-cut irregular ferroelectric crystal 5 such as a Z-cut GMO crystal are disposed in a polarizing system comprising a polarizer 2 and an analyzer 3 opposed in parallel to each other, in such a manner that the Z-cut surface of the Z-cut crystal 5 is perpendicular to the optical axis of the polarizing system and that the principal axes of the two crystals are in the direction, as shown in FIG. 4, then the value of the resulting retardation will be the sum of or the difference between retardations $R_1$ and $R_2$ in accordance with the direction of the optic axial plane of the GMO crystal.

Also, if two Z-cut single crystals belonging to the point group $imm2$ and having retardations $R_1$ and $R_2$ respectively and a double-refractive crystal having a retardation $R_0$ are disposed in such a manner that the Z-cut surfaces thereof are perpendicular to the incident linearly polarized light and the other two axes are aligned with each other, and if an electric field is applied to the two single crystals belonging to the point group $imm2$ to suitably reverse their spontaneous polarization, then there is established a summing or subtracting relationship between $R_0$, $R_1$, and $R_2$ provided by the respective crystals. A summing relationship takes place when the crystal polarization is not reversed, whereas when the polarization is reversed by a field applied to the GMO single crystals a subtracting relationship occurs so that the resulting retardation of the two biaxial crystals is represented by $R_1 - R_2$. Thus, the interference colors provided by the various wavelengths of the natural light incident upon the polarizing system are varied for $R_1 + R_2$ and $R_1 - R_2$. According to the present invention, it is further possible to interpose a combination of one or more double-refractive crystal plates and one or more irregular ferroelectric crystal plates belonging to the point group $imm2$ between the parallel polarizer and analyzer, so that an electric field is applied to the irregular ferroelectric crystals to reverse the spontaneous polarization thereof to thereby provide a kind of optical shutter device.

According to the present invention, shutter action is effected for natural light by selecting the thickness of the respective crystals so that the resulting retardation of the double-refracted light transmitted through the double-refractive crystal and the irregular ferroelectric crystal is within a predetermined range.

The above-described optical shutter device of the present invention enables the quantity of light passing through a thin plate of colorless transparent crystal to be readily controlled by a voltage, and this leads to the following advantages:
1. electrically controllable arrangement;
2. no extraneous force is required to maintain the stop condition;
3. very high response speed which is in order of 1/1000 second;
4. simple construction of the device, thus economizing the space required;
5. a high shock-resistivity; and
6. semi-permanent life with ease of maintenance of the device.

Thus, the present invention has a great industrial value in that it is effectively applicable to the stop in an EE camera, the automatically operated stop in a television telephone camera, or the digital pattern producing element for recording information in the optical memory of an electronic computing machine by the use of laser holography or like technique.

DESCRIPTION OF THE PREFERRED EMBODIMENTS

The invention will now be described by way of example in conjunction with the accompanying drawings.

Figure 5A:
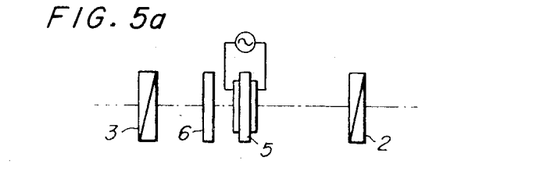
FIGS. 5a and 5b schematically show an example of the optical shutter according to the present invention.
Figure 5B:
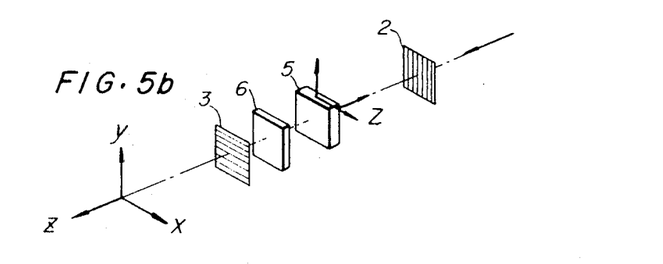

Referring to FIGS. 5a and 5b the optical shutter device of the present invention comprises a polarizer 2 having the vibration plane thereof disposed along the y-axis, an analyzer 3 having the vibration plane thereof disposed along the x-axis, a first ferroelectric-ferroelastic double-refractive crystal plate 5 whose optical axes X and Y are adapted to rotate 90° about the Z-axis, and a second double-refractive crystal plate 6, both crystal plates being interposed between the polarizer 2 and analyzer 3. While FIGS. 5a and 5b show one crystal plate 5 and one crystal plate 6, the number of these crystal plates may be greater as desired. The arrangement is such that applying a voltage or a stress to the first crystal plate 5 causes this crystal to rotate the optic axial plane thereof by 90° about the Z-axis and that the resultant R of the retardations provided by the first and second crystal plates 5 and 6 can shift between condition I (R = 0) and condition II ($80 \leq R \leq 320$) or between condition I and condition III ($2000 \leq R$).

Figure 6:
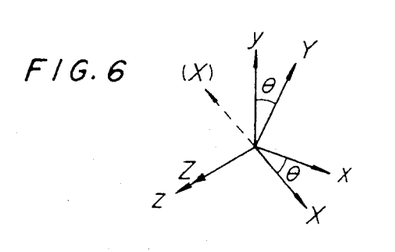
FIG. 6 illustrates the relationship between the crystal axis and the spatial axis.

FIG. 6 shows the relation between the optical axes X, Y, Z and spatial axes x, y, z of the crystals, in which axes Z and z are in accord with the direction of light path and axes X and Y are inclined clockwise by an angle $\theta$ with respect to the x- and y-axes, respectively.

With the above-described arrangement, the linearly polarized light provided through the polarizer 2 passes through the first and second double-refractive crystal plates 5 and 6 so as to be formed into elliptically polarized light. More concretely, condition I, i.e., R = 0 takes place in the closed position of the shutter device so that the linearly polarized light provided through the polarizer 2 remains as it is, and stopped by the analyzer 3. On the other hand, in the open position of the shutter, condition II, i.e., $80 \leq R \leq 320$ or condition III, i.e., $2000 \leq R$ takes place so that there is provided elliptically polarized light whose greater component passes through the analyzer 3, and thus most of the light is allowed to pass through the analyzer 3 to effect a shutter action. Alternatively, it is possible to omit the analyzer 3 and provide a mere element which can rotate the vibration plane of the linearly polarized light by 90°, instead of acting as a shutter element.

If the retardations provided by the first and second double-refractive crystal plates are selected otherwise, then it is of course possible to use the shutter device of the present invention not only with natural light but also with monochromatic light.

Description will be made of the manner in which the shutter action is effected by utilizing the fact that the linearly polarized light provided through the polarizer 2 is usually formed into elliptically polarized light through the double-refractive crystal plate 5.

A wavelength $\lambda$ is taken as an example. The linearly polarized light provided through the polarizer 2 is expressed as:
$$y = A \sin 2\pi t/T \quad (1)$$
If the thickness of the crystal plate 5 is $d$ and the difference between the two different refractive indices of the double-refracted light for the wavelength $\lambda$ is $n_2 - n_1$, then the retardation $\delta$ for light of wavelength $\lambda$ is given thus:
$$\delta = 2\pi d(n_2 - n_1)/\lambda \quad (2)$$
Hence, components $x$ and $y$ of the amplitude of the elliptically polarized light after passing through the crystal plate 5 are given as follows:
$$A_x = A^2 \sin^2 2\theta \sin^2 \delta/2 \quad (3)$$
$$A_y = A^2(\cos^2 2\theta + \sin^2 2\theta \cos^2 \delta/2)$$
$$= A^2(1 - \sin^2 2\theta \sin^2 \delta/2) \quad (4)$$
The ellipse provided by the elliptically polarized light is represented by:

$$\frac{x^2}{A^2 \sin^2 2\theta \sin \frac{\delta}{2}} + \frac{y^2}{A^2 \left(\cos^2 2\theta + \sin^2 2\theta \cos^2 \frac{\delta}{2}\right)}$$

$$- \frac{2 \cos \delta}{A^2 \sin^2 2\theta \sin \frac{\delta}{2} \sqrt{\cos^2 2\theta + \sin^2 2\theta \cos^2 \frac{\delta}{2}}} xy = \sin^2 \delta \quad (5)$$

Thus, if the light passing through the analyzer 3 is adjusted to be zero or to assume a certain value, there is then provided an optical shutter.

In other words, if it is possible to establish the following relations:
 a. $A_x \neq 0$ for any wavelength in the "On" position of the shutter, and
 b. $A_x = 0$ for any wavelength in the "Off" position of the shutter,
then the optical shutter is effective for natural light. Now that $\delta$ is the only term related to $\lambda$ as seen from the equation (3), the condition (b) above can be satisfied if $\delta$ could be 0 independently of wavelength. The condition (a) above is also possible, because if $\lambda$ is limited within the wavelength range of visible light the following relation can be chosen:
$$\delta/2 \neq 0, \pi, 2\pi \ldots \text{(for any } \lambda\text{)}$$
The foregoing example refers to the case where crossed-Nicol prisms are used. Discussion will now be made for the case of parallel-Nicol prisms. In order to provide an optical shutter for natural light, the same conditions as shown above must be met, that is,
 a. $A_y \neq 0$ for any wavelength in the "On" position of the shutter, and
 b. $A_y = 0$ for any wavelength in the "Off" position of the shutter.

Assume that $\lambda$ is limited within the wavelength range of visible light. Then, the condition (a) above can be satisfied by the equation (4), whereas the condition (b) cannot be satisfied unless, when $2\theta = 90°$, $\delta/2 = \pi/2, 3\pi/2 \ldots$ (for any $\lambda$)
However, this relation is usually incompatible with the equation (2) which expresses $\delta$.

For any given wavelength, parallel-polarizers provide a shutter for natural light because either $A_y = 0$ or $A_y = A^2$ is possible.

Figure 7A:
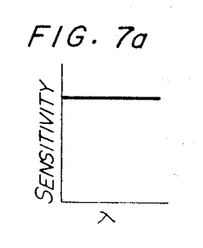
FIGS. 7a, 7b, and 7c are graphs for illustrating the wavelength sensing characteristic of an analyzer.
Figure 7B:
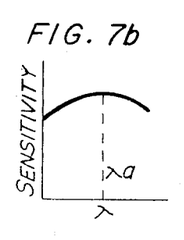
Figure 7C:
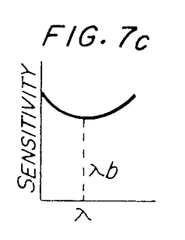

The case of cross-polarizers will be further discussed with respect to the aforementioned conditions (a) and (b). In the condition (b), the relation that $A_x = 0$ for any wavelength can be simply attained by obtaining the relation that $\delta = 0$, i.e., by nullifying the double-refraction effect. This can be accomplished, for example, by arranging two identical crystals with their optical axes disposed in such directions that their respective double-refractions negate one other. As regards the condition (a), it is desirable to attain the relation that $Ax \neq 0$ for any wavelength but attain the relation that $Ax = A^2$ for the wavelength at a given point so that as much visible light as possible may pass through the crossed-polarizers. If the analyzer used subsequently for the shutter has a flat wavelength sensing characteristic as shown in FIG. 7a, a wavelength $\lambda$max providing $Ax = A^2$ may be adjusted to the mean wavelength $\lambda m$ of the visible light, to thereby provide the characteristic as shown in FIG. 4a. If the wavelength sensing characteristic of the analyzer is such that the wavelength sensitivity thereof reaches the peak value for a specific wavelength $\lambda a$ as shown in FIG. 7b, and also if $\lambda a > \lambda m$, then the analyzer is adjusted to show the characteristic as shown in FIG. 8b for $\lambda$max < $\lambda m$. In case of the characteristic as shown in FIG. 7c, the analyzer is adjusted to show the characteristic of FIG. 8c so as to provide the relation that $\lambda$max = $\lambda b$.

Figure 8A:
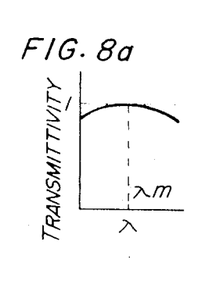
FIGS. 8a, 8b, and 8c and FIG. 9 are graphs for illustrating the transmitting characteristic of the shutter when it is in the "On" position.
Figure 8B:
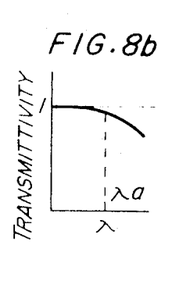
Figure 8C:
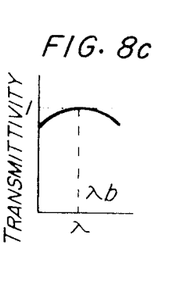
Figure 9:
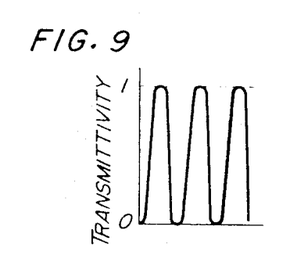

In addition to the examples of the transmission characteristic having a single peak value in the "On" position of the shutter as shown in FIGS. 8a, 8b, and 8c, use may be made of the characteristic having a plurality of peak values as shown in FIG. 9 to obtain transmitted light approximately equal to natural light.

Figure 10:
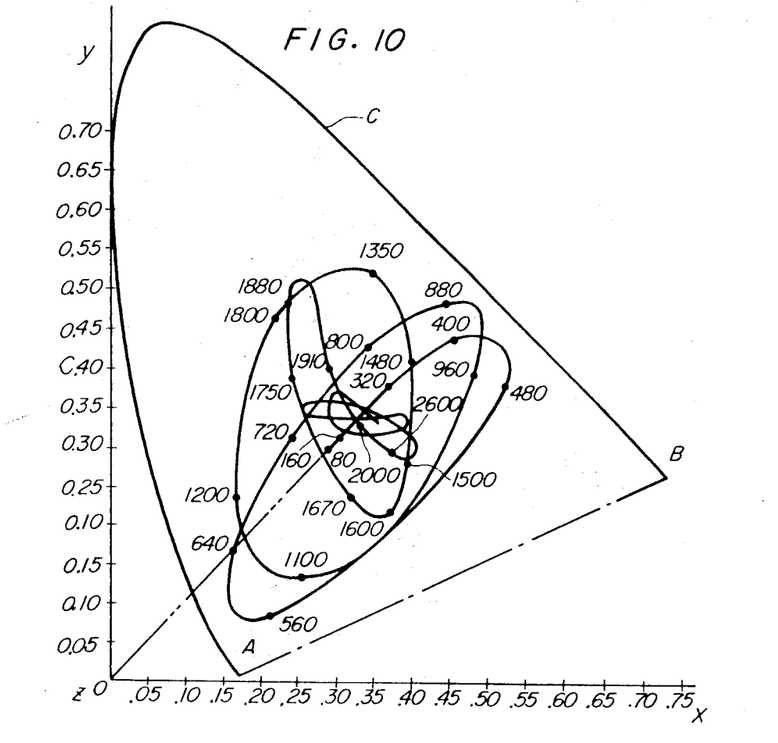
FIG. 10 is a CIE color chart showing the retardation R of a double-refractive crystal plate interposed between two crossed-polars or two crossed polarizers.

This will now be described with reference to a CIE chromaticity chart. The retardation provided by the crystal is defined by the following equation:

$$R = 2\pi/\lambda d(n_2 - n_1),$$

where $d$ represents the thickness of the crystal plate 5 and $n_2 - n_1$ represents the birefringence for the wavelength $\lambda$. If the thickness $d$ of the crystal plate 5 is varied, the retardation $R$ is also varied. FIG. 10 shows a CIE chromaticity chart illustrating the manner in which color changes for various retardation values. In the chart, the angular coordinates $x$ and $y$ represent $x$ and $y$ of the three primary colors, the outer curve $c$ (indicated by a solid line) represents the locus provided by a series of spots showing the spectral colors, and the horseshoe-shaped area defined by the said locus and the straight dash-and-dot line AB (corresponding to pure violet) indicates various actual colors. The numerical values given in FIG. 10 show the various values of R. The chromaticity of a light source having a luminous spectrum (i.e., natural source of light) lies at the coordinates:

$$x = 0.33, y = 0.33$$

From this position toward the circumference of the horseshoe shape, the degree of color mixture decreases to approach pure colors provided by the respective spectra. As seen from FIG. 10, if $R = 0$, there is no transmitted light, and in the range of $R = 80$ to 320, substantially white color is provided. As R increases to exceed 2,000, there is again provided substantially white color. This is because the spectrum of transmitted light becomes as shown in FIG. 9.

Accordingly, if the conditions I, II, and III are defined thus:
Condition I: $R = 0$
Condition II: $80 \leq R \leq 320$
Condition III: $2000 \leq R$ then the shutter action will be such that the shift of condition can take place either from condition I to condition II or III or conversely, that is, either from right to left or from left to right.

Examples of the present invention will be shown below.

EXAMPLE 1

Figure 11:
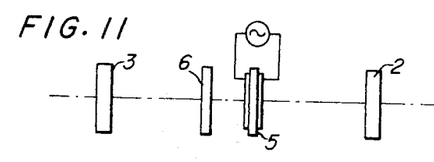
FIG. 11 is a diagrammatical view of the arrangement according to an embodiment of the present invention.

As shown in FIG. 11, two first and second double-refractive Z-cut GMO single crystal plates 5 and 6 are disposed in a diagonal position between a polarizer 2 and an analyzer 3.

The two polarizers are arranged to provide crossed-fields of polarization. Each of the Z-cut single crystal plates 5 and 6 has a thickness of 330$\mu$. If the Z-cut single crystal plates 5 and 6 are disposed with their axes X and Y deviated 90° from each other, that is, in such a manner that the axes X and Y of the z-cut single crystal plate 5 are in accord with the axes Y and X of the other Z-cut single crystal plate 6, then the retardation provided by these Z-cut single crystal plates 5 and 6 is $R = R_1 - R_2 = 0$ ($\because R_1 = R_2$) because they have the same thickness, and thus there is no light other than the leakage light resulting from the crossed-polarizers.

If the X- and Y-axes of the single crystal plate 5 is interchanged by a field (operable at 150 volts) applied thereto, the X- and Y-axes of both crystal plates are in accord with each other to provide a summing relation between their retardations, hence $$R = R_1 + R_2$$

Figure 12:
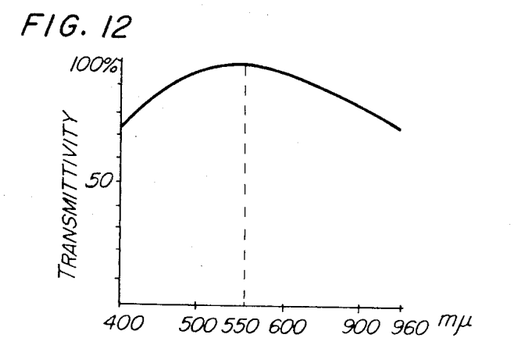
FIG. 12 is a graph showing the transmission spectrum of the polarizing unit having a retardation R = 276 mµ.

In case of Z-cut GMO single crystal plates having a thickness of 330 $\mu$, $$R_1 = R_2 = 138 \, m\mu$$

and therefore the spectrum transmitted through the polarizing unit for $R = 275 \, m\mu$ is as shown in FIG. 12. T = 100 percent for $\lambda = 550 \, m\mu$, and thus, for $\lambda = 400 \, m\mu$ to 760 $m\mu$, the energy transmittivity as a whole is 92 percent.

When an experiment has been carried out by using two commercially available polarizers, the ratio of quantity of light stopped to the total quantity of light transmitted has proved to be 1:1000, i.e., 60 dB, which means a ratio 1:920 for the aforesaid crystal plates 5 and 6. This provides a practically sufficient damping ratio.

The crystal plate 5 may be any plate providing a retardation of 138 $m\mu$, namely, having a wavelength corresponding to the mean wavelength of natural light, and thus quartz, for instance, may be used.

When use is made of an X-cut or Y-cut quartz plate, the thickness thereof is 16$\mu$. The quartz plate is disposed in a diagonal position.

EXAMPLE 2

Figure 13:
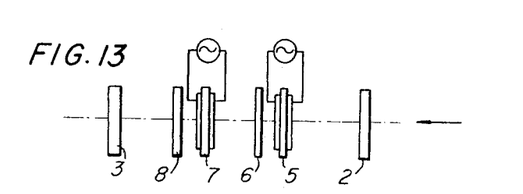
FIG. 13 is a diagrammatical view of the arrangement according to another embodiment of the present invention.

Referring to FIG. 13, four crystal plates 5, 6, 7, and 8 are disposed between the polarizer 2 and analyzer 3.

The crystal plate 5 is a Z-cut GMO crystal having a thickness of 330$\mu$. The optical axis Y of the crystal plate 5 is clockwise inclined by an angle $\theta$ with respect to the vibration plane of the polarizer 2. The crystal plate 6 may be any material having a retardation of 138 $m\mu$, but the optical axes thereof must be perfectly in accord with those of the crystal plate 5. Thus, light having a wavelength $\lambda = 550 \, m\mu$ passes through the set of crystal plates 5 and 6 to be thereby rotated $2\theta$ with respect to the vibration plane of the polarizer 2. The crystal plate 7 is formed of Z-cut GMO crystal and disposed with the optical axis Y thereof inclined by an angle $\alpha$ counterclockwise with respect to the vibration plane of the polarizer 2.

The crystal plate 8 may be formed of any material having a retardation of 138 $m\mu$, such as Z-cut GMO plate with a thickness of 330$\mu$. The optical axes of the crystal plate 8 are perfectly in accord with those of the crystal plate 7. Thus, light having a wavelength $\lambda = 550 \, m\mu$ passes through the set of crystal plates 7 and 8 to thereby rotate a further $2\alpha$. After all, the light is rotated an angle of $(2\theta + 2\alpha)$ in total with respect to the vibration plane of the polarizer 2. Therefore, if $\theta + \alpha = 45°$, light having a wavelength of 550 $m\mu$ is formed into linearly polarized light whose polarization plane has been rotated by 90°, and 100 percent passes of it through the analyzer 3.

The advantage of this arrangement is that the sets of crystal plates 5, 6 and 7, 8 may be combined into a block so as to provide $\theta + \alpha = 45°$, whereby the orientation of the block and that of the polarizer can be freely set to suitable angles as desired.

In practice, such orientations may be adjusted and fixed to certain angles suitable for passing the greatest possible quantity of light after the assemblage has been completed.

When the shutter is to be closed, a voltage is applied to the GMO crystal plates 5 and 7 to rotate the optical axes X and Y by 90° so as to provide zero retardation in the respective sets of crystal plates 5, 6 and 7, 8, thus resulting in crossed polarities of the polarizer 2 and analyzer 3, and accordingly in no transmitted light.

For the clarity of description, the foregoing two examples have been illustrated with respect to the case where only a voltage is applied for operation, whereas a stress may be applied for control, if desired, as will be shown in the following example.

EXAMPLE 3

Figure 14A:
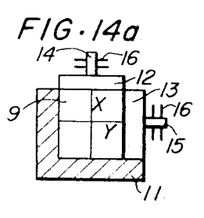
FIGS. 14a and 14b show the arrangement according to yet another embodiment of the present invention.
Figure 14B:
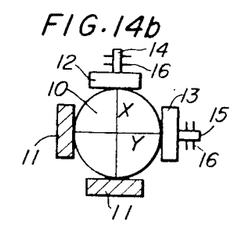

As shown in FIGS. 11 and 13, Z-cut GMO single crystal plates each having a thickness of $330\mu$ are used to form a polarizing unit, which is additionally provided with press means as shown in FIGS. 14a and 14b.

The press means shown in FIGS. 14a and 14b is directed to operate the double-refractive crystal plates, an element 9 formed with faces perpendicular to the axes X and Y of the crystal plate and faces parallel to the Z-axis of the crystal, and a Z-cut disc 10. The press means comprises fixing elements 11, and pressing elements 12 and 13 having projections 14 and 15 supported by guides 16. The press means is designed such that the pressure exerted on the projections 14 and 15 of the pressing elements 12 and 13 imparts a pressure normal to the X- and Y-axes of the crystal plates.

If one of the projections 14 and 15 of the pressing elements 12 and 13, e.g., the projection 15, is pressed to apply a pressure to the crystal plate along the Y-axis thereof, the crystal will shrink so that the crystallographic Y-axis thereof turns into the X-axis, which means a 90° rotation of the optical axis. However, when the crystallographic Y-axis has turned into the X axis, any more pressure applied to the crystal plate would cause no further variation therein.

Thus, the crystallographic Y-axis changes into a position rotated 90° with respect to the Z-axis. This position is in accord with the direction in which the projection 14 of the other pressing element 13 is pressed, and therefore, if the projection 15 of the pressing element 15 is again pressed, the optic axial plane of the crystal is again rotated 90° with respect to the Z-axis to return to its original position.

By pressing the orthogonal pressing elements alternately in the above-described manner, the optical axis can be rotated 90° and returned to its original position. The polarizing unit of FIG. 11 or FIG. 13 provided with such elements can provide a shutter device for natural light which can stop or pass the light by the use of an applied stress.

EXAMPLE 4

Two Z-cut GMO crystal plates each having a thickness of $3,000\mu$ are prepared. One of the two GMO crystal plates is provided with a transparent electrode formed of $SnO_2$ on each Z-cut face thereof over the entire area. The electrodes are connected to a desired voltage source. Both the GMO crystal plates are put in a state of single domain and put together such that their azimuths are in agreement with each other. Then, the composite retardation between the double-refracted light passed through the composite GMO crystal plate is 2,500 m$\mu$.

When an element consisting of the composite GMO crystal plate is interposed in diagonal relationship between a pair of parallel polarizer plates arranged such that their polarizing directions are orthogonal, a desired optical shutter device is provided. In this device, if a voltage is applied to the one GMO crystal plate provided with the electrodes to reverse the polarization of the crystal plate, the sign of retardation therein becomes opposite to that in the other crystal plate. Since the thickness of the two plates are equal to each other, the light linearly polarized by the polarizer on the entrance side passes through the element without being affected thereby, but is shut out by the polarizer on the exit side. When the signs of the retardations of the two GMO crystal plates are equal, the retardations are added together to become a total of 2,500 m$\mu$.

For the above-described operation to be realized, the fact that the thicknesses of the two crystal plates are equal to each other is a necessary condition. For the total retardation R = 2,000 m$\mu$ or more, it is sufficient for the thickness of each GMO crystal to be $2,400\mu$ or more.

While the above example has been described with respect to the case where the crystal plate is formed of GMO in order to explain the principle of the optical shutter according to the present invention, use may also be made of any material having ferroelasticity. In addition to GMO and isomorphic materials, it is possible to use, for example, potassium hydrogen phosphate (KDP), boracite or the like, although the following requirements must be met. KDP must be used after being dipped in liquid nitrogen, for instance, since it must be kept at a temperature of $-150°$ C or below. Also, boracite or like material must be formed into about one tenth of the thickness of GMO, say, $34\mu$, since the value of their birefringence are about 10 times larger than that of GMO.

What is claimed is:

1. An optical shutter comprising a pair of crossed polarizing means, at least one Z-cut irregular ferroelastic-ferroelectric crystal plate and at least one double-refractive crystal plate both interposed between said pair of polarizing means, said crystal plates having a thickness selected so that the retardation of double-refractive light passing through said double-refractive crystal plate is equal to the retardation of double-refractive light passing through said Z-cut irregular ferroelastic-ferroelectric crystal plate and that the value of the resulting retardation R of said crystal plates in the open position of said shutter satisfies one of the relationships $80 \leq R \leq 320$, $2,000 \leq R$, and means provided on said irregular ferroelastic-ferroelectric crystal plate for applying thereto a field or stress at least equal to the magnitude of the coercive field or stress, respectively, of that crystal plate.

2. An optical shutter as defined in claim 1, wherein said irregular ferroelastic-ferroelectric crystal is gadolinium molybdate.

3. An optical shutter comprising a pair of crossed polarizing means, at least one Z-cut irregular ferroelectric crystal plate and at least one plate of double-refractive material plate both interposed between said pair of polarizing means, said crystal plates having a thickness selected so that the retardation of double-refracted light passing through said plate of double-refractive material is equal to the retardation of double-refracted light passing through said Z-cut irregular ferroelectric crystal plate and that the value of the resulting retardation R of said crystal plates in the open position of said shutter becomes $80 \leq R \leq 320$, a transparent electrode provided in the Z-cut plane of said irregular ferroelectric crystal, and electric means for applying through said transparent electrode a field at least equal to the magnitude of the coercive field of said irregular ferroelectric crystal.

4. An optical shutter as defined in claim 3, wherein said irregular ferroelectric crystal is gadolinium molybdate.

5. An optical shutter as defined in claim 4, wherein said transparent electrode is formed of $SnO_2$.

6. An optical shutter comprising a pair of crossed polarizing means, at least one Z-cut irregular ferroelectric crystal plate and at least one double-refractive material plate both interposed between said pair of polarizing means, said crystal plates having a thickness selected so that the retardation of double-refracted light passing through said double-refractive material plate is equal to the retardation of double-refracted light passing through said Z-cut irregular ferroelectric crystal plate and that the value of the resulting retardation R of said crystal plates in the open position of said shutter becomes $R \geq 2000$, a transparent electrode provided in the Z-cut plane of said irregular ferroelectric crystal, and electric means for applying through said transparent electrode a field at least equal to the magnitude of the coercive field of said irregular ferroelectric crystal.

7. An optical shutter as defined in claim 6, wherein said irregular ferroelectric crystal is gadolinium molybdate.

8. An optical shutter as defined in claim 7, wherein said transparent electrode is formed of $SnO_2$ or $InO_2$.

9. An optical shutter comprising a pair of crossed polarizing means, at least one Z-cut irregular ferroelectric crystal plate and at least one double-refractive crystal plate both interposed between said pair of polarizing means, said crystal plates having a thickness selected such that the retardation of double-refracted light passing through said double-refractive crystal plate is equal to the retardation of the double-refracted light passing through said Z-cut irregular ferroelectric crystal plate and that the value of the resulting retardation R of said crystal plates in the open position of said shutter becomes $80 \leqq R \leqq 320$, and pressure means are provided to said irregular ferroelectric crystal plate for applying thereto a stress at least equal in magnitude to the coercive stress of that crystal plate by means of pressing elements movable along the X- and Y-axes of said crystal plate.

10. An optical shutter as defined in claim 9, wherein said irregular ferroelectric crystal is gadolinium molybdate.

11. An optical shutter comprising a pair of crossed polarizing means, at least one Z-cut irregular ferroelectric crystal plate and at least one double-refractive crystal plate both interposed between said pair of polarizing means, said crystal plates having a thickness selected so that the retardation of double-refracted light passing through said double-refractive crystal plate is equal to the retardation of double-refracted light passing through said Z-cut irregular ferroelectric crystal plate and that the value of the resulting retardation R of said crystal plates in the open position of said shutter becomes $R \geqq 2000$, and pressure means provided to said irregular ferroelectric crystal plate for applying thereto a stress at least equal to the magnitude of the coercive stress of that crystal plate by means of pressing elements movable along the X- and Y-axes of said crystal plate.

12. An optical shutter as defined in claim 11, wherein said irregular ferroelectric crystal is gadolinium molybdate.

* * * * *